(12) United States Patent
Almadi

(10) Patent No.: US 11,983,188 B2
(45) Date of Patent: May 14, 2024

(54) SYSTEMS, DEVICES, AND METHODS FOR NETWORK AND OBSOLESCENCE MANAGEMENT

(71) Applicant: Saudi Arabian Oil Company, Dhahran (SA)

(72) Inventor: Soloman M. Almadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 173 days.

(21) Appl. No.: 17/526,124

(22) Filed: Nov. 15, 2021

(65) Prior Publication Data

US 2023/0153316 A1 May 18, 2023

(51) Int. Cl.
*G06F 16/25* (2019.01)
*G06F 8/61* (2018.01)
*G06F 8/71* (2018.01)
*G06F 16/23* (2019.01)
*G06F 16/27* (2019.01)

(52) U.S. Cl.
CPC .............. *G06F 16/252* (2019.01); *G06F 8/61* (2013.01); *G06F 8/71* (2013.01); *G06F 16/2365* (2019.01); *G06F 16/27* (2019.01)

(58) Field of Classification Search
CPC . G06F 16/252; G06F 8/61; G06F 8/71; G06F 16/2365; G06F 16/27; G06F 8/70

USPC ........................................................ 707/722
See application file for complete search history.

(56) References Cited

U.S. PATENT DOCUMENTS

| 9,552,480 | B2 | 1/2017 | Bell, Jr. et al. | |
| 10,592,674 | B2* | 3/2020 | Tadic | G06F 21/577 |
| 2014/0064138 | A1* | 3/2014 | Urdang | H04L 41/14 370/254 |
| 2014/0067621 | A1* | 3/2014 | Urdang | G06Q 10/20 705/27.1 |

FOREIGN PATENT DOCUMENTS

CN 105045608 A 11/2015

* cited by examiner

*Primary Examiner* — Michael Pham
(74) *Attorney, Agent, or Firm* — DINSMORE & SHOHL LLP

(57) ABSTRACT

Systems and methods are provided for network and obsolescence management. In one embodiment, a platform device is provided including a real-time system interface module (RSIM), a database module (DBM), a logic control module (LCM) and a reporting module (RM). The platform device collects data for network elements, systems, devices and network services, and examines the network elements and network service to generate a network obsolescence report. The platform device may output an obsolescence report including one or more obsolescence measurements. Processes are also provided for network and obsolescence management.

18 Claims, 5 Drawing Sheets

SYSTEMS, DEVICES, AND METHODS FOR NETWORK AND OBSOLESCENCE MANAGEMENT

BACKGROUND

The present disclosure relates to network and system management, and obsolescence management for Information Technology (IT) systems and Information Operation Technology (OT) systems, and systems and methods for systems and methods for obsolescence measurement, evaluation and reporting of technology infrastructure. Existing life cycle management for Information Technology (IT) systems and Information Operation Technology (OT) systems may be fragmented and inefficient, causing obsolete software to remain long after effective use. There exists a need for systems and methods for determining obsolescence of network elements and network software.

BRIEF SUMMARY

The present disclosure introduces life cycle management for Information Technology (IT) systems and Information Operation Technology (OT) systems. Network systems are often fragmented and inefficient, and can include obsolete software long after effective use of the software. Embodiments of the present disclosure are directed to network management including systems and methods to perform system wide obsolescence measurements of enterprise or industrial systems installed at facilities. As used herein, network and obsolescence management may include management for at least one of networks, systems and devices. Systems, device configurations and methods described herein can provide automated and holistic assessment of networks. The results of such measurements, and evaluation and reporting of the measurements, can provide automation system data to support preventative maintenance planning, extend life cycles, and optimize capital program decisions.

According to embodiments, a platform is provided to monitor and predict the state of Information Technology infrastructure obsolescence of enterprise and or industrial systems installed at facilities through such generated measurements and automation system data. The platform may be a platform device configured to integrate with systems, including network management and operation systems, based on standard interfaces. According to embodiments, the platform may be incorporated into equipment of a network, such as one or more processors. The platform can include a plurality of modules, such as a real-time interface module (RSIM), a database module (DBM), a logic control module (LCM), and a reporting module. The RSIM collects attributes from different networks in support of different services, such as data services, voice services, and wireless services. Attributes may include, for example, identification information, software version, equipment life cycle, and installation information such as install site and date. The DBM includes attributes of equipment obsolescence records, such as maintenance records, reliability records, availability records, quantities, and directives information (such as Safety, Technology, Regulation, and Company Directions, including description and projected time and impacts).

Embodiments include system and network platform apparatus for systems life cycle management of Information Technology (IT) systems and Information Operation Technology (OT). A platform device according to embodiments can proactively support the implementation, administration both IT and OT Networks & Systems Obsolescence assessment. The platform device can monitor, report and predict the state of Information Technology infrastructure obsolescence of enterprise and or industrial systems installed at facilities. The result of the obsolescence measurements, evaluation and report provide an automated system data in support of preventive maintenance planning, extending life cycle, and capital program decisions.

According to embodiments, systems are provided to include a platform device. Device configurations are provided for a standalone platform device and for integration of operations and functions of a platform device into network architecture. Similarly, processes are provided for a platform device. As used herein, references to a platform and a platform device may be interchangeable.

According to embodiments, network management including systems and methods to perform system wide obsolescence measurements of enterprise or industrial systems installed at facilities include a platform device to monitor and generate obsolescence measurements of integrated network software. The platform device can use a scorecard for assessing network elements and network software. The platform may be used to report software having a score for an evaluated criteria (for separate categories) below a threshold. Scores may be evaluated using different mathematical models such as a geometric means analysis (such as a square root means determination) for evaluated criteria for separate categories. Based on determined scores, a platform device can immediately report software having a score for an evaluated criteria (for separate categories) at zero. The platform device can also generate an economics report including a recommendation of whether to maintain an evaluated software based on the measurements.

In accordance with embodiments of the present disclosure a platform device for network and obsolescence management is provided. The platform device includes a non-transitory computer-readable memory storing instructions for a real-time system interface module (RSIM), a database module (DBM), a logic control module (LCM) and a reporting module (RM). The platform device includes one or more processors to execute the instructions of the non-transitory computer-readable memory. The one or more processors are configured to collect, using the real-time system interface module (RSIM) of a platform device, data for network elements and network services, and store, using the database module (DBM) of the platform device, the data for the network elements and the network services. The one or more processors are configured to examine, using the logic control module (LCM) of the platform device, the network elements and network service to generate a network obsolescence report. Generating the network obsolescence report includes applying a plurality of obsolescence criteria categories to the data for the network elements and network services, and determining obsolescence measurements for the network elements, network services, and network software. The one or more processors are configured to output, using the reporting module (RM) of the platform device, the obsolescence report.

In one embodiment, collecting data by a real-time system interface module (RSIM) includes monitoring software used by the network elements and the network services, and collecting attributes for at least one of software identification, software version, equipment life cycle, and software installation.

In one embodiment, collecting data by a real-time system interface module (RSIM) includes monitoring data for at least one of a server, computer device, application software and intelligent device.

In one embodiment, collecting data includes at least one of receiving device data for at least one non-connected device and receiving data from an attribute source.

In one embodiment, storing includes storing attributes of equipment obsolescence records for at least one of maintenance records, reliability records, availability records, network quantity, and software directives.

In one embodiment, examining by the logic control module includes examining network software using a plurality of performance categories and producing a measurement of obsolescence impact and infrastructure, wherein each performance category includes at least one element for scoring software obsolescence.

In one embodiment, determining obsolescence measurements scoring network software using at least five categories to generate a score for the network software for each category.

In one embodiment, determining includes performing a geometric means analysis for evaluated criteria of the plurality of obsolescence criteria categories.

In one embodiment, determining obsolescence measurements of integrated network software includes use of the obsolescence measurements to manage network software.

In one embodiment, outputting includes outputting a report including a recommendation to remove evaluated software based on obsolescence measurements.

In one embodiment, obsolescence report includes a recommendation to address the monitored software based on the obsolescence measurements.

In one embodiment, the one or more processors are further configured to manage network software using the obsolescence report.

According to another embodiment, a method for network and obsolescence management is provided. The method includes collecting, by a real-time system interface module (RSIM) of a platform device, data for network elements and network services, and storing, by a database module (DBM) of the platform device, the data for the network elements and the network services. The method also includes examining, by a logic control module (LCM) of the platform device, the network elements and network service to generate a network obsolescence report. Generating the network obsolescence report includes applying a plurality of obsolescence criteria categories to the data for the network elements and network services, and determining obsolescence measurements for the network elements, network services, and network software. The method also includes outputting, by a reporting module of the platform device, the obsolescence report.

In one embodiment, collecting data by a real-time system interface module (RSIM) includes monitoring software used by the network elements and the network services, and collecting attributes for at least one of software identification, software version, equipment life cycle, and software installation.

In one embodiment, storing includes storing attributes of equipment obsolescence records for at least one of maintenance records, reliability records, availability records, network quantity, and software directives.

In one embodiment, examining by the logic control module includes examining network software using a plurality of performance categories and producing a measurement of obsolescence impact and infrastructure, wherein each performance category includes at least one element for scoring software obsolescence.

In one embodiment, determining obsolescence measurements scoring network software using at least five categories to generate a score for the network software for each category.

In one embodiment, determining includes performing a geometric means analysis for evaluated criteria of the plurality of obsolescence criteria categories.

In one embodiment, determining obsolescence measurements of integrated network software includes use of the obsolescence measurements to manage network software.

In one embodiment, outputting includes outputting a report including a recommendation to remove evaluated software based on obsolescence measurements.

In one embodiment, the obsolescence report includes a recommendation to address the monitored software based on the obsolescence measurements.

In one embodiment, the method includes managing network software using the obsolescence report.

In one embodiment, the method includes correlating the obsolescence report to at least one of a network, system, and device vendor life cycle.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
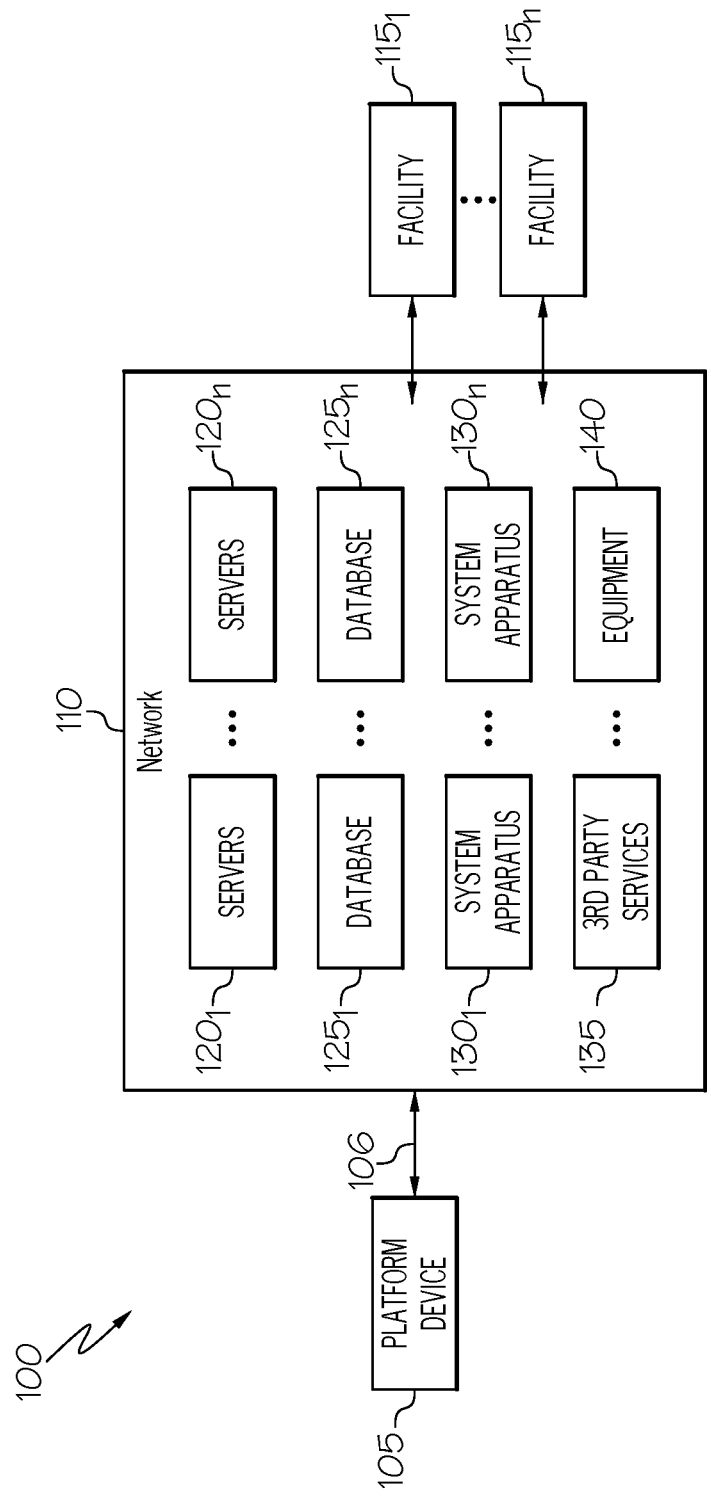
FIG. 1 illustrates a graphical representation of a system and platform device configurations for network and obsolescence management according to the present disclosure.

Referring to FIG. 1, a system 100 is provided for network and systems obsolescence management. System 100 includes a platform device 105 configured to asses elements of network 110, including one or more of servers, computers, application software and intelligent devices. Platform device 105 can assess and manage system level and device level configurations for Information Technology (IT) systems and Information Operation Technology (OT) systems of network 110. As a result, platform device 105 and system 100 provide life cycle management for network 110 and a plurality of facilities $115_{1-n}$. Embodiments are described herein for the implementation, administration, and IT and OT network and system obsolescence assessment by platform device 105 for network 110. Platform device 105 is configured to monitor, report, and predict the state of Information Technology infrastructure obsolescence of enterprise and or industrial systems installed at facilities $115_{1-n}$. The result of the obsolescence measurements, evaluations and reports by platform device 105 provide an automated system data in support of preventive maintenance planning, extending life cycle, and capital program decisions.

According to embodiments, a platform device 105 is provided to interface with network 110 by way of link 106, which may be a wired or wireless link. In FIG. 1, network 110 represents Technology (IT) systems and Information Operation Technology (OT) systems of for one or more facilities (e.g., facilities $115_{1-n}$) which may be local or distributed to one or more locations. With network management, it may be difficult to manage network components over time. Platform device 105 represents device configurations for one or more devices that may connect with and assess network 110. According to embodiments, platform device 105 may relate to or include one or more processors separate from elements and infrastructure of network 110. According to other embodiments, functions of platform device 105 may be performed by one or more processors of network 110 (e.g., equipment 140). In such a configuration, system 100 may include one or more processors of network 110 to perform operations and determinations described herein. Although shown as different elements in FIG. 1, elements of network 110 may relate to elements and infrastructure located in one or more locations, including facilities $115_{1-n}$. Network 110 may be located at least partially in physical locations of facilities $115_{1-n}$, or may be provided by network elements serving the locations associated with facilities $115_{1-n}$. As used herein, network elements may include, and are not limited to one or more of servers, computer devices, application software and intelligent devices of network 110.

As shown in FIG. 1 and according to embodiments, network 110 can include one or more of servers $120_{1-n}$, databases $125_{1-n}$, system apparatuses $130_{1-n}$, third party services 135 and equipment 140. Servers $120_{1-n}$ may be configured to host software applications and service data requires. Databases $125_{1-n}$ may be configured to store data for network 110. System apparatuses $130_{1-n}$ may relate to one or more operational units and infrastructure of network 110. Third party services 135 may relate to software applications running on network 110 and utilized by the network to provide services. Equipment 140 relates to equipment in general that may be associated with network 110, and may include one or more of, storage devices, input/output devices, etc. to provide services of network 110. According to embodiments, network 110 may provide one or more types of services for facilities $115_{1-n}$, including but not limited to communication (e.g., messaging, etc.), software hosting, file storage and sharing, data storage and retrieval and operation or one or more machines. Facilities $115_{1-n}$ may be locations, plants, production centers, etc. of a business entity and each facility may include a plurality of software applications. Equipment 140 of network 110 may be located at one or more of facilities $115_{1-n}$. Each element of network 110 may utilize software, and some software components may not be visible to all users of a network. In addition, some software applications of a network, especially back end software systems may not be visible to users of the network. Systems, devices and methods described herein allow for assessment of software utilized by network 110 as well as network components. Embodiments including obsolescence determinations and reporting to identify obsolete software of network 110 and actions to address obsolescence. Operations described herein may be system level and device level configurations for Information Technology (IT) systems and Information Operation Technology (OT) systems of network 110. As a result, platform device 105 and system 100 provide life cycle management for network 110 and a plurality of facilities $115_{1-n}$.

According to embodiments, system 100 is configured to provide life cycle management for Information Technology (IT) systems and Information Operation Technology (OT) systems to detect obsolete software prior to expiration of effective use and following effective use. Operations described herein are performed by one or more processing devices and as a result may provide automated, holistic, system wide obsolescence measurements of enterprise or industrial systems installed at facilities $115_{1-n}$. Results of measurements by platform device 105, and evaluation and reporting of the measurements by platform device 105 can provide automation system data to support preventative maintenance planning, extend life cycles, and optimize capital program decisions.

According to embodiments, platform device 105 is configured to monitor and predict the state of Information Technology infrastructure obsolescence of enterprise and or industrial systems installed at facilities $115_{1-n}$ through generated measurements and automation system data. According to embodiments, platform device 105 is configured to integrate with systems and network management and operation systems based on standard interfaces. According to yet other embodiments, platform device 105 may include at least one processor and a plurality of modules. As discussed below in FIG. 2 and according to embodiments, a platform device can include a real-time interface module (RSIM), a database module (DBM), a logic control module (LCM), and a reporting module (RM). According to embodiments, the RSIM collects attributes from different networks, such a network 110, in support of different services, such as data services, voice services, and wireless services. Attributes may include, for example, identification information, software version, equipment life cycle, and installation information such as install site and date. The DBM includes attributes of equipment obsolescence records, such as maintenance records, reliability records, availability records, quantities, and directives information (such as Safety, Technology, Regulation, and Company Directions, including description and projected time and impacts). Attributes of network 110 may be used to generate measurements of obsolescence. According to embodiments, platform device 105 may use attributes from at least one of includes servers $120_{1-n}$, databases $125_{1-n}$, system apparatuses $130_{1-n}$, third party services 135 and equipment 140. Similarly, platform device 105 may use attributes for at least one of facility, such as facilities $115_{1-n}$, Based on collected attributes, platform device 105 may score one or more elements and software of network 110. Discussed below in FIG. 3, platform device 105 may use one or more processes for measuring obsolescence. Discussed in FIG. 5, platform device 105 may generate one or more reports based on obsolescence and manage network elements.

References to obsolescence described herein may relate to one or more measures of criteria for assessing use and applicability of software to operations of network 100. It should be appreciated that the systems and methods described herein may be applied to other types of software and are not limited to network software. In addition, it should also be appreciated that systems, devices and methods described herein may be applied to network components (e.g., devices). As such, obsolescence may include measurement of performance of network 110 and/or network components (e.g., hardware and software) relative to criteria.

According to embodiments, system 100 and platform device 105 provide Information Technology (IT) systems and Information Operation Technology (OT) systems life cycle management. According to embodiments, platform 105 supports enterprise and industrial domains based on predefined attributes. In addition, platform device 105 may be automated and integrated with the installed facility IT and OT assets. Platform device 105 can provide proactive measures, triggers, and reporting utilizing different systems, network, and users interface module. System 100 provides an Information and Operation Technology Life Cycle Management System (IOTLCM) which includes platform device 105 configured to integrate with Systems and Network Management and Operation Systems that based on standard interfaces such as Simple Network Management System (SNMP), OLE for Process Control (OPC), Server-to-Server communication, IoT, IIoT, Digital Twin, and relational databases among others. According to embodiments, platform device 105 connects to network 105 as a standalone device or can be placed in a virtual storage platform, and or internal or external computing cloud. According to embodiments, platform device 105 may be integrated with IT and OT systems that can operate in a real-time mode or non-real-time mode, and in centrally or distributed deployed interfaces with Enterprise Resource Planning Systems and manufacturer system.

Figure 2:
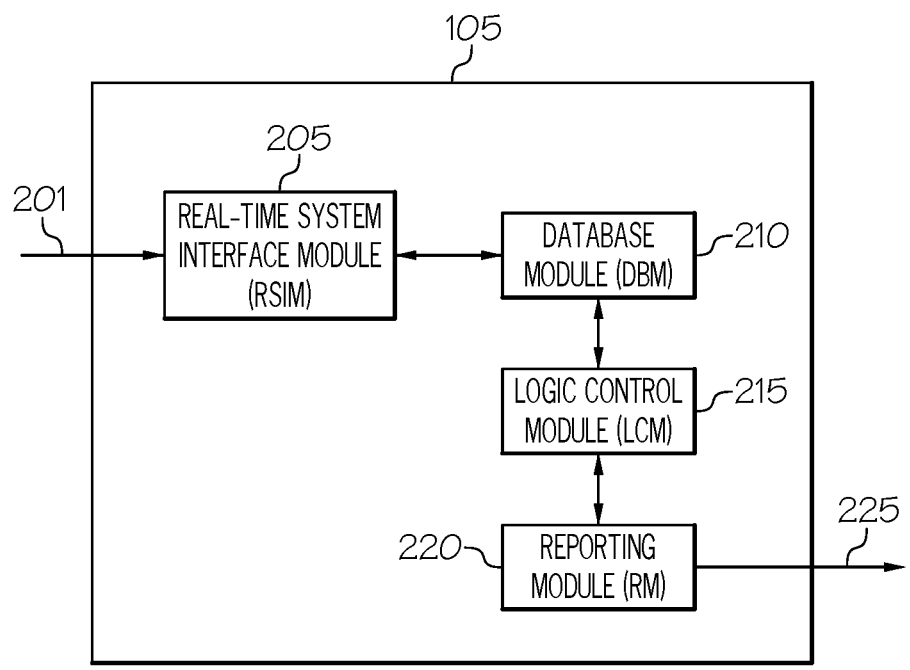
FIG. 2 illustrates modules of a platform device for network and obsolescence management according to the present disclosure.

FIG. 2 illustrates modules of platform device 105 for network and obsolescence management according to the present disclosure. According to embodiments, platform device 105 may be configured to include a plurality of modules for network and obsolescence management including Real-Time System Interface Module (RSIM) 205; Database Module (DBM) 210; Logic Control Module (LCM) 215; and Reporting Module (RM) 220. Platform device 105 can connect to an actual network as a standalone device or can be placed in a virtual storage platform, and or internal or external Computing cloud. Platform device 105 may receive input 205 for assessing a network. Platform device 105 may also generate output 225 based on network assessments.

Figure 4:
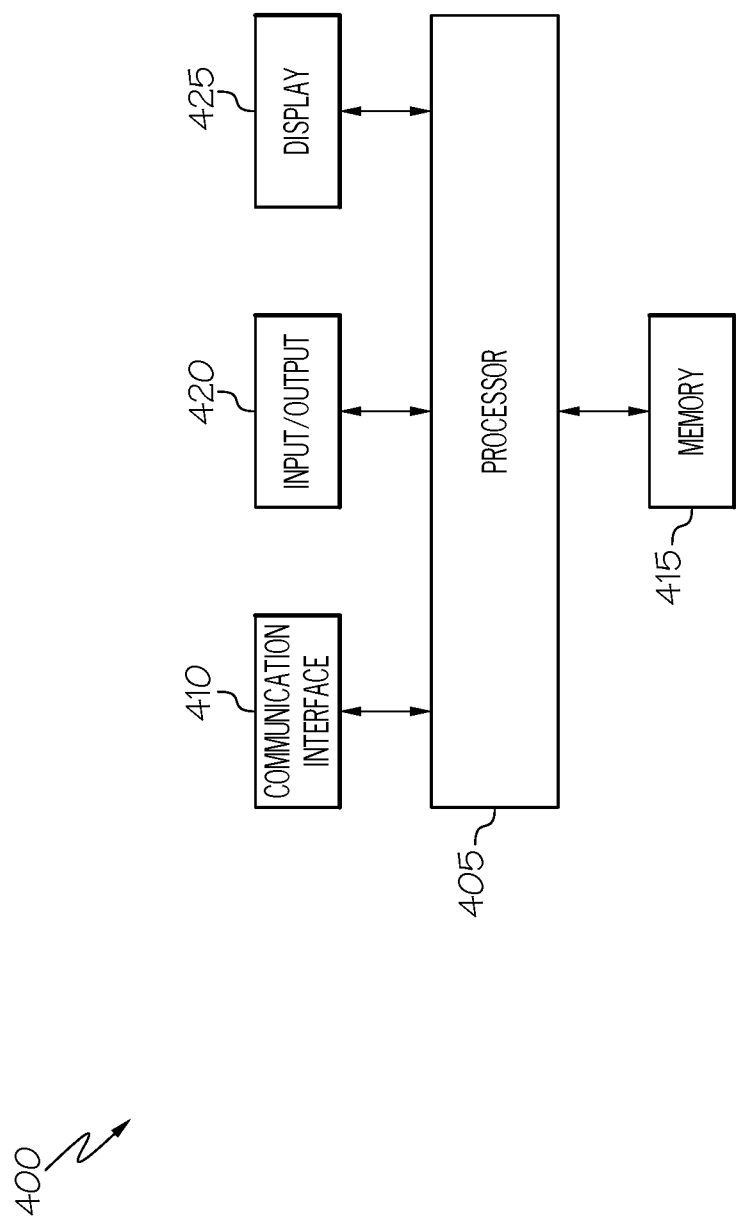
FIG. 4 illustrates a platform device configuration.

Modules of platform device 105 may relate to functional operations performed by one or more processors of device, such as device 400 of FIG. 4. According to embodiments, modules of platform device 105 may relate to one or more processors of a network (e.g., network 100). According to embodiments, real-time system interface module (RSIM) 205 of platform device 105 collects data for network elements and network services. According to embodiments, database module (DBM) 210 of the platform device 105 stores data for the network elements and the network services. According to embodiments, Real-Time System Interface Module (RSIM) 205 provides a system interface that collect attributes from the different networks, system apparatuses, system software application, 3rd party vendors, etc. in support of the different services. According to embodiments, collected attributes by RSIM 205 provide a make-up of an apparatus profile for use in obsolescence determinations. According to embodiments, attributes collected by RSIM 205 include one or more or attributes for equipment records including at least one or asset number, system type, manufacturer, model number, software version, warranty period, equipment life cycle, installation site, and installation date.

Database Module (DBM) 210 may be configured to store equipment obsolescence records attributes. According to embodiments, DBM 210 can store maintenance records, obtained from a network management station NMS and/or maintenance and support logs/records system, which can include hardware repair, and software/batch upgrades. According to embodiments, DBM 210 can store reliability records; obtained from a network management station (NMS) and/or a maintenance and support logs/records system which includes node failure, interface failure and their frequency. According to embodiments, DBM 210 can store availability data obtained from NMS and/or maintenance and support logs/records system, which includes down time of network equipment. By way of example, when availability=1−(Down time in Hrs/365*24). According to embodiments, DBM 210 can store data for quantities at facility level which can be obtained from maintenance and support logs/records system and/or NMS. According to embodiments, DBM 210 can store quantities at a companywide level based on data obtained from maintenance and support logs/records system and/or NMS. According to embodiments, DBM 210 can store vendor notification regarding component life cycle. According to embodiments, DBM 210 can also store directives for safety directives, technology directives, regulation directives and company directives. Each directive may include a description of the directive, the projected time and impacts of the directive.

Logic control module (LCM) 215 supports infrastructure obsolescence criteria as, for example, a scorecard based upon which to determine the generated automated obsolescence measurements. In embodiments, nine elements in five categories as listed below may be analyzed against established threshold values. Additional criteria system performance categories and their elements may be added. According to embodiments, each element has a measure to be evaluated and measured. A score reflecting the state of the element is identified to measure the impact of obsolescence on the infrastructure functionality. When scored and summed, the criteria and elements produce an objective measure of obsolescence. Additionally, threshold values for each of the criteria may be established. Those criteria that are at or above the threshold value will trigger subsequent activity. Measurements by LCM 215 provide more in-depth indication of the condition of the products, systems and facilities. In embodiments, an obsolescence criteria score may be based on a geometric mean (e.g., square root) rather than an average mean to eliminate subjectivity.

According to embodiments, criteria for scoring obsolescence may include criteria for reliability, support, technology, directive, and economics. Reliability criteria may assess how reliable a network element or software is. Elements for evaluation of reliability may include node failure and availability of the software from each of a complete system level and at a node level. Support criteria may asses the ability of software to be updated and modified for use. Elements for evaluation of support criteria can include whether spare parts and/or technical service is available, software application longevity, and system scalability. Technology criteria may assess the technical development of software. Elements for evaluation of technology may include age (design lifecycle age) of the software and a technology road map (e.g., technology Packet vs. TDM, New Features, etc.). Directive criteria may assess directives for use from one or more business units. Elements for evaluation of directive criteria may include compliance to company, government, or international standards, regulation, safety, or directives. Economics criteria may be directed to feasibility of using network and systems due to cost. Elements for evaluation of economics criteria may include operational and maintenance cost.

LCM 215 may examine network elements and network service to generate a network obsolescence report using criteria. Generating the network obsolescence report can include examine applying a plurality of obsolescence criteria categories to the data for the network elements and network services, and determining obsolescence measurements for the network elements, network services, and network software. The measurements may be used to generate a scorecard. Obsolescence measurements based on the scorecard may be reported via reporting module 220 and output as a report using output 225. Output can include issues with recommendations upon any of the five categories (Reliability, Support, Technology, Directive, and Economics) being under 50% or immediately upon any category being at zero.

Platform device 105 may provide several benefits including a platform to monitor and generate obsolescence measurements of integrated network software. According to embodiments, platform device 105 may assess software by generating a scorecard using a geometric means analysis (such as a square root means determination) for evaluated criteria for separate categories. Platform device 105 can report software having a score for an evaluated criteria (for separate categories) below a threshold. Platform device 105 can immediately report software having a score for an evaluated criteria (for separate categories) at zero. Platform device 105 can generate an economics report including a recommendation of whether to maintain an evaluated software based on the measurements. According to embodiments, platform device 105 can may be integrated with IT and OT systems that can operate real-time mode, or non-real-time mode, centrally or distributed deployed and interfaces with Enterprise Resource Planning Systems and manufacturer systems.

Platform device 105 may also protect information technology infrastructure asset life cycle for both corporate and industrial domains. For example, manual effort may be reduced by deploying integrated and automated systems. Quality data and overall life cycle management may also be increased by minimizing data entry error and or delayed in data gathering. Platform device 105 may also support multiple applications and interface to other Enterprise Resource Planning (ERP) tools thus increasing the workflow efficiency. Platform device 105 may also provide proactive method to identify obsolescence. According to embodiments, platform device 105 may also protect information technology infrastructure asset life cycle for both corporate and industrial domains. Life cycle may be determined and proactive automated altering and monitoring for the life cycle management is provided. Platform device 105 may also provide an integrated automated Life Cycle Management Apparatus/system that can support the complete life cycle management for IT and OIT infrastructure. Platform device 105 may also minimize number of fragmented systems and workflows supporting Life Cycle Management. Platform device 105 may also provide reduced timelines of supporting Life Cycle Management by providing a proactive method. Platform device 105 may also address integration of both system interfaces and workflows.

Figure 3:
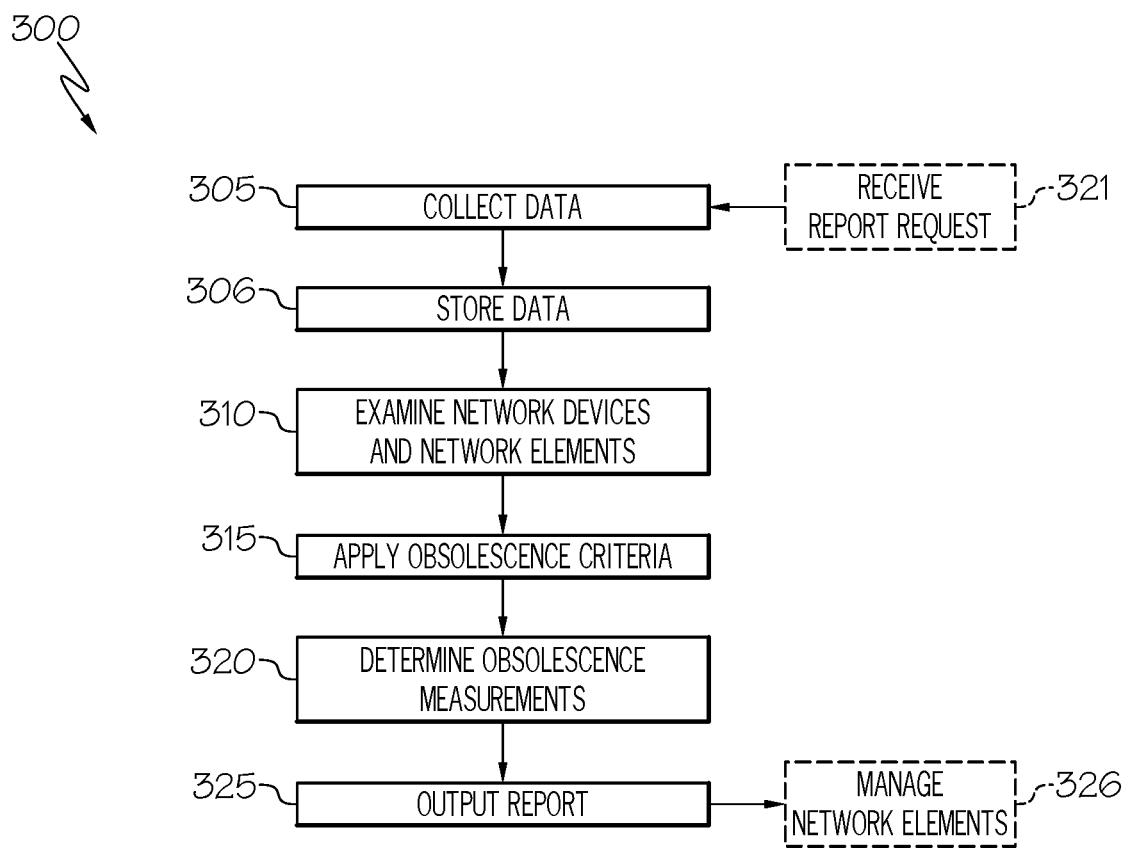
FIG. 3 illustrates a process for network and system obsolescence management.

FIG. 3 illustrates a process for network, systems, and device obsolescence management. Process 300 may be performed for networks serving one or more facilities and one or more locations. Monitoring of network components, and especially network software for obsolescence, is required to ensure network operation. Process 300 may be performed by one or more elements of system 100, including but not limited to platform device 105. Blocks of process 300 may be performed by one or more modules of platform device 105.

Process 300 may be initiated by collecting by a real-time system interface module (RSIM) of a platform device, data for network elements and network services at block 305. According to embodiments, collecting data by a real-time system interface module (RSIM) includes monitoring software used by the network elements and the network services, and collecting attributes for at least one of software identification, software version, equipment life cycle, and software installation. In certain embodiments, process 300 may be performed automatically or periodically to assess network software and components of a network. According to another embodiment, collection of data may be based on monitoring data for at least one of a server, computer device, application software and intelligent device. According yet to another embodiment, collecting data may include receiving device data for at least one r non-connected device. Elements of a network may include attributes not visible to a network. One or more attributes and/or device characteristics may be uploaded and/or provided manually for collection. According to other embodiments, data for network elements may be collected by receiving data from an attribute source, such as one or more of device manufacturer, third part service, etc. Data may be collected in response to receiving a report request at optional block 321.

At block 306, a database module (DBM) of the platform device store the data for the network elements and the network services. Attributes of equipment obsolescence records may be stored at block 306 for at least one of maintenance records, reliability records, availability records, network quantity, and software directives At block 315, a logic control module (LCM) of the platform device may examine the network elements and network service to generate a network obsolescence report. Generating the network obsolescence report can include applying a plurality of obsolescence criteria categories to the data for the network elements and network services at block 315, and determining obsolescence measurements at block 320 for the network elements, network services, and network software. According to embodiments, examining by the logic control module at block 310 includes examining network software using a plurality of performance categories and producing a measurement of obsolescence impact and infrastructure. Each performance category can include at least one element for scoring software obsolescence.

Determining obsolescence measurements at block 320 can include scoring network software using at least five categories to generate a score for the network software for each category. In addition, a geometric means analysis may be performed at block 320 for evaluated criteria of the plurality of obsolescence criteria categories. The obsolescence measurements of integrated network software are determined and used to manage network software.

According to embodiments, scoring of network software may be determined as part of obsolescence measurements at block 320. At block 315, each element, or at least each element being analyzed, has a measure to be evaluated and measured. A score reflecting the state of the element is identified to measure the impact of obsolescence on the infrastructure functionality at block 320 based on the application of obsolescence criteria at block 315. When scored and summed, they produce an objective measure of a systems obsolescence, which can also include a score for particular network software. Additionally, threshold values for each of the criteria may be established. Those criteria that are at or above the threshold value will trigger subsequent activity. These measurements provide more in-depth indication of the condition of the products, systems and facilities.

Scoring as listed below may be employed by process 300 and may be analyzed against established threshold values. In embodiments, an obsolescence criteria score may be based on a geometric mean (e.g., square root) rather than an average mean to eliminate subjectivity.

Obsolescence Criteria and Scoring Methodology

Obsolescence criteria are applied at block 315 by utilizing the equipment information obtained from the Obsolescence database and Plants' maintenance and support logs/records system. The criteria require careful and deliberate evaluation using the best information and data available. According to embodiments, the obsolescence criteria score is based on geometric mean and not the averages (or central tendency). This is to minimize subjectivity by eliminating the needs for weights and bring forward obsolescence elements to the surface during criteria implementation. For example, the average of 3 and 6 is (3+6)/2=4.5. However, the geometric mean for these two numbers is Square Root of (3*3)=Square Root (9)=3. So, the geometric Mean results in reflecting the minimum number which is in our case an indicator for obsolescence. The geometric mean minimizes subjectivity by eliminating the needs for weights and bring forward obsolescence elements to the surface during criteria implementation. The Obsolescence Criteria score is based on Geometric Mean and not the Averages (or central tendency).

According to embodiments, obsolescence criteria categories have elements with attributes that are applied and scored for each IT infrastructure type within each facility. The categories and elements' attributes can include: reliability, node failure, availability (complete system level not node level), support, spare part/technical support, software application longevity, system scalability, technology, age (design lifecycle age), technology road map (technology Packet vs. TDM, New Features, etc.) and directives. Additional criteria system performance categories and their elements may be added.

According to embodiments, obsolescence criteria are applied at block 315 by utilizing the equipment information obtained from the obsolescence database and maintenance and support logs/records system (e.g., facility, plant records, etc.). The criteria require careful and deliberate evaluation using the best information and data available. Evaluation of network software and equipment can include assessment of failure rate. Tables I and II illustrate scoring for reliability criteria. Table I illustrates node failure rate and includes scoring for quantities of activities related to failure.

TABLE I

| | Annual Failure Rate | |
|---|---|---|
| Score | Quantitative | Qualitative |
| 10 | 0 | Negligible: failure is not expected |
| 5 | ≤2 | Medium: Failure has occurred in the past few years |
| 0 | ≥3 | High: Failure has occurred few times a year |

Table II illustrates availability rate and includes scoring for quantities of activities related to availability. Scores in Table II Quantify the system/equipment or component annual availability rate, which have caused service shutdowns (Duration of Shutdown).

TABLE II

| | Annual Availability Rate | |
|---|---|---|
| Score | Quantitative | Qualitative |
| 10 | ≤99.99% | Low: 54 minutes of service shutdown a year |
| 5 | ≤99.9% | Medium: 8 Hours & 46 Minutes of service shutdown a year |
| 0 | ≥99.5% | High: 1 Day, 19 Hours & 48 Minutes of service shutdown a year |

According to another embodiment, criteria may be applied for support at block 315. Support criteria may be applied to rate the relative ease and economy of time and resources with which an item can be retained in, or restored to a specified condition. Further, the criterion also includes the system scalability to support growth or new feature. Scoring may be based on setting a Support Score=Geometric Mean=Cubic Root (Spare Part & Technical Support-Score*Software Application Longevity-Score*System Scalability-Score). Availability of Spare Part and Technical Support may then be rated in number of months until Vendor Notice for Obsolescence as shown in Table III.

TABLE III

| | Months Until Vendor Notice for Obsolescence | |
|---|---|---|
| Score | # of Months | Description |
| 10 | >24 | No spare parts availability but vendor can provide support |
| 5 | 12< | No spare parts availability but vendor can provide support |
| 0 | 0 | No spare parts availability but vendor can provide support) |

Table IV rates the software application longevity on the installed IT asset as compared to vendor's latest software release version.

TABLE IV

| | Months Until Vendor Notice for Obsolescence | |
|---|---|---|
| Score | # of Months | Description |
| 10 | >24 | Subsequent Release has not been deployed. |
| 5 | >12 | Subsequent Release was announced and deployable but current release is supported |
| 0 | 12< | Subsequent Release was announced and deployable and current release is no longer supported within 12 months |

Table V rates system scalability, such as ability to expand, enhance or upgrade infrastructure system to add additional business functionality or capacity.

TABLE V

| | Months Until Vendor Notice for Obsolescence | |
|---|---|---|
| Score | # of Months | Description |
| 10 | >24 | Ability to support new capacity and functionality |
| 5 | >12 | Limited ability to support new capacity and functionality |
| 0 | 12< | Inability to support new capacity and functionality |

According to another embodiment, criteria may be applied for technology at block 315. Technology criterion is intended to rate the state of the technology and the ability to upgrade the product to a more current or active product. Considerations should include the extent of migration possible and the utility, purpose or benefit derived from such a migration. Scoring may be based on setting Technology Score=Geometric Mean=Square Root (Age-Score*Technology Road Map-Score). Technology Age (design lifecycle age) may be rated as compared to current state of the implemented IT asset as shown in Table VI.

TABLE VI

| | Technology Age (Years) | |
|---|---|---|
| Score | # Multiple of Manufacturer Design Life | Description |
| 10 | >2* (Age) | Equipment or System Age |
| 5 | <1.5* (Age) | Equipment or System Age |
| 0 | ≤1* (Age) | Equipment or System Age |

Table VII rates the Technology relating to its roadmap (technology Packet vs. TDM, New Features, etc.).

TABLE VII

| | Technology Roadmap | |
|---|---|---|
| Score | # Years to Reach Obsolescence | Description |
| 10 | >5 | Projected Date of Technology Obsolescence Based on Industry Trends or Major Consulting Firms |
| 5 | >3 | Projected Date of Technology Obsolescence Based on Industry Trends or Major Consulting Firms |
| 0 | >2 | Projected Date of Technology Obsolescence Based on Industry Trends or Major Consulting Firms |

According to another embodiment, criterion may be applied for compliance at block 315. Compliance criteria is intended to rate compliance to Company, Government, or International Standards, Regulation, Safety, or other Directives. Considerations should include the time compliance, ability to extend time, and ability to partially comply based on setting Directive Score=Geometric Mean=(Compliance-Score). Compliance to Company, Government, or International Standards, Regulation, Safety, or Directives that is Applicable only for new system(s) or equipment(s) may be rated as shown in Table VIII.

TABLE VIII

| | Directive | |
|---|---|---|
| Score | # of Years to compliance | Description |
| 10 | NA | Applicable only for new system (s) or equipment(s) |
| 5 | >3 | Applicable Retroactively to all Existing Applicable Systems(s) or Equipment(s) |
| 0 | <3 | Applicable Retroactively to All Applicable System(s) or Equipment(s) |

According to another embodiment, criterion may be applied for economics at block 315. Economics criteria is intended to provide a score that is based upon operational and maintenance cost. Economics may be based on setting Economics Score=Geometric Mean=(Compliance-Score).

According to another embodiment, criterion may be applied for performance at block 315. Performance criteria may be based on the current operational and maintenance performance rating as compared to the current state of the IT asset as shown in Table IX.

TABLE IX

| | Performance Rating | |
|---|---|---|
| Score | Classification | Description |
| 10 | Excellent | Less than replacement cost |
| 5 | Good | Similar cost |
| 0 | Poor | Greater than Replacement |

According to another embodiment, criterion may be applied for a selected attribute at block 315. The new selected attribute criteria may be defined based on a plurality of factors and may be defined by technical and/or management directives.

TABLE X

| | "Configurable Attribute" Rating | |
|---|---|---|
| Score | Classification | Description |
| 10 | Excellent | Less than replacement cost |
| 5 | Good | Similar cost |
| 0 | Poor | Greater than Replacement |

At block 320, process 300 includes outputting an obsolescence report t for at least one of network software and network elements. The repot may be output by a reporting module of the platform device. The report may include data to generate one or more visualizations. According to embodiments, outputting includes outputting an economics report including a recommendation to remove evaluated software based on obsolescence measurements. The obsolescence report can also include a recommendation to address the monitored software based on the obsolescence measurements. The report output at block 325 may overcome or early life cycle triggers invoked early in the operation life of an asset. In addition, the report may be used for preventive maintenance planning and mitigation control compliance.

Process 300 may optionally include managing network software using the obsolescence report at optional block 326. Managing obsolescence software can include remove of the software, replacement of the software, and/or updating of the software. According to embodiments, managing network software and/or network elements at block 326 can include correlating an obsolesce report to at least one of a network, system and device vendor lifecycle. By way of example, the findings of the obsolescence report including estimate use or lifetime of a network element may be compared to service life provide by a manufacturer/vendor of the network element. Elements exciting a service life of a vendor life cycle may be considered obsolete and require further action. Operations at block 326 may allow for extending life cycle and/or deferring capital program decisions.

FIG. 4 illustrates a platform device according to embodiments. Platform devices (e.g., platform device 105) may include one or more components. FIG. 4 depicts a graphical representation of platform device 400. Platform device 400 may be part of a system, such as system 100. Platform device 400 may be configured to receive data from a plurality of sources, and/or or other system servers, for at least one of data integration, data analysis and report generating. According to embodiments, platform device 400 includes processor 405, communication interface 410, memory 415, input/output block 420 and display 425.

Processor 405 may relate to a processor or control device configured to execute one or more operations stored in memory 415, such as processes for obsolescence measurement. Memory 415 may be a non-transitory computer-readable memory storing instructions for a real-time system interface module (RSIM), a database module (DBM), a logic control module (LCM) and a reporting module (RM). Processor 405 may be coupled to memory 415, I/O 420 and communication module 410. Processor 405 may be configured to control operations based on one or more inputs from I/O block 420.

Processor 405 may be configured to perform one or more processes herein including process 300 of FIG. 3. According to embodiments, processor 405 may include one or more processors to execute the instructions of memory 415 to collect, using a real-time system interface module (RSIM) of a platform device, data for network elements and network services. Processor 405 may store, using the database module (DBM) of the platform device, the data for the network elements and the network services. Processor 405 may also examine, using the logic control module (LCM) of the platform device, the network elements and network service to generate a network obsolescence report. Generating the network obsolescence report by the processor includes applying a plurality of obsolescence criteria categories to the data for the network elements and network services, and determining obsolescence measurements for the network elements, network services, and network software. Processor 405 may also control output, using the reporting module (RM) of the platform device, of an obsolescence report.

Figure 5:
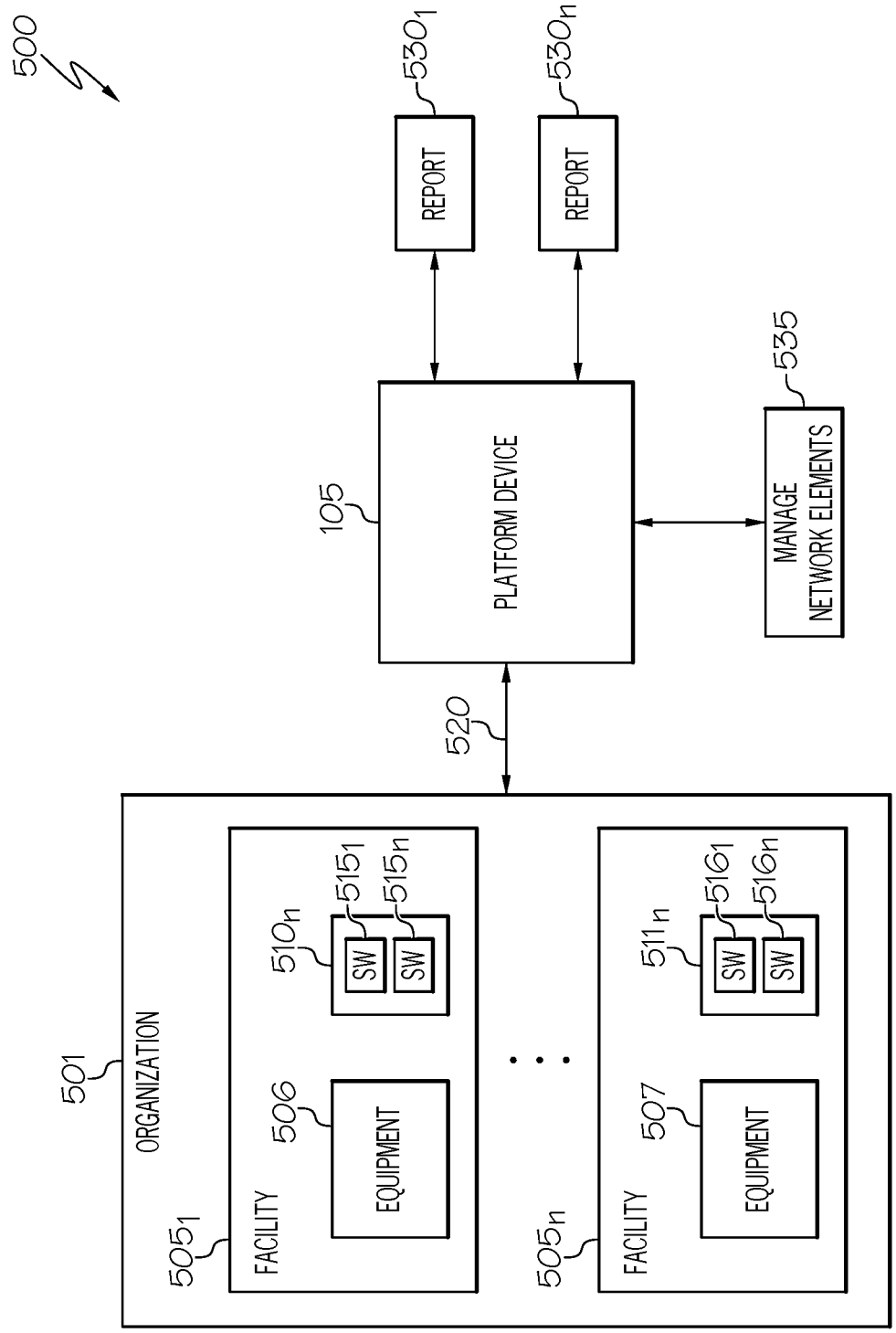
FIG. 5 illustrates a graphical representation of generating a report for network and obsolescence management.

FIG. 5 illustrates a graphical representation of generating a report for network and obsolescence management. System 500 is provided for network and obsolescence management of organization 501. Organization 501 may be a business entity and includes a plurality of facilities $505_{1-n}$ (e.g., facilities $115_{1-n}$). Each facility of facilities $505_{1-n}$ can include equipment, 506, 506 and networks $510_{1-n}$ and $510_{1-n}$. Networks $510_{1-n}$ and $510_{1-n}$ may also include software $515_{1-n}$ and $516_{1-n}$, respectively. Platform device 520 may interface with organization 501 by way of networks $510_{1-n}$ and $510_{1-n}$. According to embodiments and using the process and device configurations described herein, platform device 105 may be configured to generate a plurality of reports, shown as $530_{1-n}$. Using reports and determinations for network software below a criteria threshold, platform device may manage network elements at block 535. Managing network elements can include removal of obsolescence network software from organization 501.

For the purposes of describing and defining the present invention it is noted that the terms "about" and "approximately" are utilized herein to represent the inherent degree of uncertainty that may be attributed to any quantitative comparison, value, measurement, or other representation. The terms "about" and "approximately" are also utilized herein to represent the degree by which a quantitative representation may vary from a stated reference without resulting in a change in the basic function of the subject matter at issue.

For the purposes of describing and defining the present invention, it is noted that reference herein to a calculation or other determination being a "function of" a value, parameter, variable, or other construct, is not intended to denote that the determination is exclusively a function of the listed value, parameter, variable, or other construct. Rather, reference herein to a determination that is a "function of" a listed construct is intended to be open ended such that the determination may be a function of a single construct or a plurality of constructs.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the terms "in which" and "wherein" as transitional phrases. For the purposes of defining the present invention, it is noted that these terms are introduced in the claims as an open-ended transitional phrase that is used to introduce a given number of claim elements and should be interpreted in like manner as the more commonly used open-ended preamble term "comprising."

What is claimed is:

1. A platform device for network and obsolescence management, the platform device comprising:
    a non-transitory computer-readable memory storing instructions for a real-time system interface module (RSIM), a database module (DBM), a logic control module (LCM) and a reporting module (RM),
    one or more processors to execute the instructions of the non-transitory computer-readable memory, the one or more processors configured to:
    collect, using the real-time system interface module (RSIM) of a platform device, data for network elements and network services;
    store, using the database module (DBM) of the platform device, the data for the network elements and the network services;
    examine, using the logic control module (LCM) of the platform device, the network elements and network service to generate a network obsolescence report, wherein generating the network obsolescence report includes applying nine elements in five obsolescence criteria categories to the data for the network elements and network services to determine obsolescence measurements for the network elements, network services, and network software, wherein the five obsolescence criteria include the following: reliability criteria, support criteria, technology criteria, directive criteria, and economics criteria, and wherein the nine elements include the following: node failure, availability of the software from, whether spare parts or technical support are available, age, compliance to company, government, or international standards, regulation, safety, or directives, operational cost, and maintenance cost;

summing and scoring, using the LCM, the obsolescence measurements to produce an objective measure of obsolescence; and comparing, using the LCM, the objective measure of obsolescence against established threshold values to create the network obsolescence report;

output, using the reporting module (RM) of the platform device, the network obsolescence report; and managing the network software using the network obsolescence report, including at least one of the following: removing the network element, replacing the network element, or updating the network element.

2. The platform device of claim 1, wherein collecting data by a real-time system interface module (RSIM) includes monitoring software used by the network elements and the network services, and collecting attributes for at least one of software identification, software version, equipment life cycle, and software installation.

3. The platform device of claim 1, wherein collecting data by a real-time system interface module (RSIM) includes monitoring data for at least one of a server, computer device, application software and intelligent device.

4. The platform device of claim 1, wherein collecting data includes at least one of receiving device data for at least one non-connected device and receiving data from an attribute source.

5. The platform device of claim 1, wherein examining by the logic control module includes examining network software using a plurality of performance categories and producing a measurement of obsolescence impact and infrastructure, wherein each performance category includes at least one element for scoring software obsolescence.

6. The platform device of claim 1, wherein determining includes performing a geometric means analysis for evaluated criteria of the plurality of obsolescence criteria categories.

7. The platform device of claim 1, wherein determining obsolescence measurements of integrated network software includes use of the obsolescence measurements to manage network software.

8. The platform device of claim 1, wherein outputting includes outputting a report including a recommendation to remove evaluated software based on obsolescence measurements.

9. The platform device of claim 1, wherein the network obsolescence report includes a recommendation to address the monitored software based on the obsolescence measurements.

10. A method for network and obsolescence management, the method comprising:

collecting, by a real-time system interface module (RSIM) of a platform device, data for network elements and network services;

storing, by a database module (DBM) of the platform device, the data for the network elements and the network services;

examining, by a logic control module (LCM) of the platform device, the network elements and network service to generate a network obsolescence report, wherein generating the network obsolescence report includes applying nine elements in five obsolescence criteria categories to the data for the network elements and network services to determine obsolescence measurements for the network elements, network services, and network software, wherein the five obsolescence criteria include the following: reliability criteria, support criteria, technology criteria, directive criteria, and economics criteria, and wherein the nine elements include the following: node failure, availability of the software from, whether spare parts or technical support are available, age, compliance to company, government, or international standards, regulation, safety, or directives, operational cost, and maintenance cost;

summing and scoring, using the LCM, the obsolescence measurements to produce an objective measure of obsolescence; and comparing the objective measure of obsolescence against established threshold values to create the network obsolescence report;

outputting, by a reporting module of the platform device, the network obsolescence report; and managing the network software using the network obsolescence report, including at least one of the following: removing the network element, replacing the network element, or updating the network element.

11. The method of claim 10, wherein collecting data by a real-time system interface module (RSIM) includes monitoring software used by the network elements and the network services, and collecting attributes for at least one of software identification, software version, equipment life cycle, and software installation.

12. The method of claim 10, wherein storing includes storing attributes of equipment obsolescence records for at least one of maintenance records, reliability records, availability records, network quantity, and software directives.

13. The method of claim 10, wherein examining by the logic control module includes examining network software using a plurality of performance categories and producing a measurement of obsolescence impact and infrastructure, wherein each performance category includes at least one element for scoring software obsolescence.

14. The method of claim 10, wherein determining includes performing a geometric means analysis for evaluated criteria of the plurality of obsolescence criteria categories.

15. The method of claim 10, wherein determining obsolescence measurements of integrated network software includes use of the obsolescence measurements to manage network software.

16. The method of claim 10, wherein outputting includes outputting a report including a recommendation to remove evaluated software based on obsolescence measurements.

17. The method of claim 10, wherein the network obsolescence report includes a recommendation to address the monitored software based on the obsolescence measurements.

18. The method of claim 10, further comprising correlating the network obsolescence report to at least one of a network, system, and device vendor life cycle.

* * * * *